United States Patent
Dube et al.

(10) Patent No.: US 9,582,735 B2
(45) Date of Patent: Feb. 28, 2017

(54) SCALABLE IMAGE MATCHING

(71) Applicant: A9.com, Inc., Palo Alto, CA (US)

(72) Inventors: Simant Dube, Sunnyvale, CA (US);
Sunil Ramesh, San Jose, CA (US);
Xiaofan Lin, Palo Alto, CA (US);
Arnab Sanat Kumar Dhua, Mountain View, CA (US); Colin Jon Taylor, Orinda, CA (US); Jaishanker K. Pillai, Mountain View, CA (US)

(73) Assignee: A9.com, Inc., Palo Alto, CA (US)

(*) Notice: Subject to any disclaimer, the term of this patent is extended or adjusted under 35 U.S.C. 154(b) by 0 days.

(21) Appl. No.: 15/063,050

(22) Filed: Mar. 7, 2016

(65) Prior Publication Data
US 2016/0189000 A1 Jun. 30, 2016

Related U.S. Application Data

(63) Continuation of application No. 14/133,252, filed on Dec. 18, 2013, now Pat. No. 9,280,560.

(51) Int. Cl.
*G06K 9/00* (2006.01)
*G06K 9/62* (2006.01)
(Continued)

(52) U.S. Cl.
CPC ..... *G06K 9/6206* (2013.01); *G06F 17/30247* (2013.01); *G06K 9/00523* (2013.01);
(Continued)

(58) Field of Classification Search
CPC .. G06K 9/6206; G06K 9/6232; G06K 9/6256; G06K 9/6269; G06K 9/6276;
(Continued)

(56) References Cited

U.S. PATENT DOCUMENTS

2006/0227992 A1 10/2006 Rathus et al.
2007/0106721 A1 5/2007 Schloter
(Continued)

OTHER PUBLICATIONS

"Non Final Office Action dated Jul. 8, 2015" received in U.S. Appl. No. 14/133,252.
(Continued)

*Primary Examiner* — Yon Couso
(74) *Attorney, Agent, or Firm* — Hogan Lovells US LLP

(57) ABSTRACT

Various embodiments may increase scalability of image representations stored in a database for use in image matching and retrieval. For example, a system providing image matching can obtain images of a number of inventory items, extract features from each image using a feature extraction algorithm, and transform the same into their feature descriptor representations. These feature descriptor representations can be subsequently stored and used to compare against query images submitted by users. Though the size of each feature descriptor representation isn't particularly large, the total number of these descriptors requires a substantial amount of storage space. Accordingly, feature descriptor representations are compressed to minimize storage and, in one example, machine learning can be used to compensate for information lost as a result of the compression.

17 Claims, 11 Drawing Sheets

(51) Int. Cl.
*G06F 17/30* (2006.01)
*H04N 19/90* (2014.01)

(52) U.S. Cl.
CPC ......... *G06K 9/6232* (2013.01); *G06K 9/6256* (2013.01); *G06K 9/6269* (2013.01); *G06K 9/6276* (2013.01); *G06K 9/6277* (2013.01); *H04N 19/00945* (2013.01)

(58) Field of Classification Search
CPC ............ G06K 9/6277; G06K 9/00523; G06K 9/4671; G06F 17/30247; H04N 19/00945
USPC ........................................................ 382/160
See application file for complete search history.

(56) References Cited

U.S. PATENT DOCUMENTS

| | | | |
|---|---|---|---|
| 2007/0217676 A1* | 9/2007 | Grauman | G06K 9/4671 382/170 |
| 2010/0046842 A1 | 2/2010 | Conwell | |
| 2011/0238676 A1 | 9/2011 | Liu et al. | |
| 2011/0299770 A1* | 12/2011 | Vaddadi | G06K 9/6211 382/165 |
| 2012/0202515 A1* | 8/2012 | Hsu | G06Q 10/087 455/456.1 |
| 2014/0307958 A1 | 10/2014 | Wang et al. | |

OTHER PUBLICATIONS

"Notice of Allowance dated Nov. 10, 2015" received in U.S. Appl. No. 14/133,252.

Sawant et al, "Enhancing Training Collections for Image Annotation: An Instance-Weighted Mixture Modeling Approach", IEEE Transactions on Image Processing, vol. 22, No. 9, Sep. 2013, pp. 3562-3577.

* cited by examiner

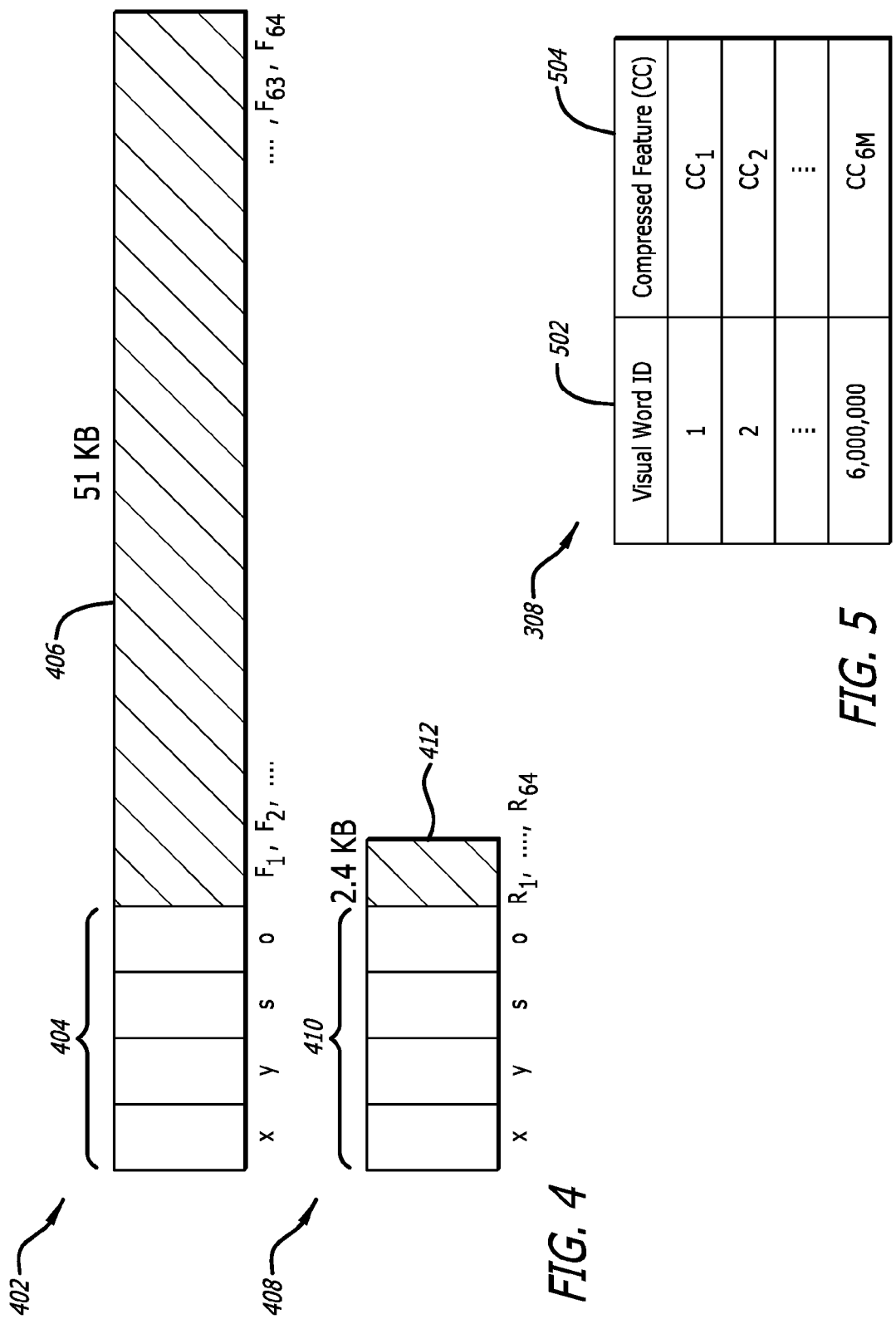

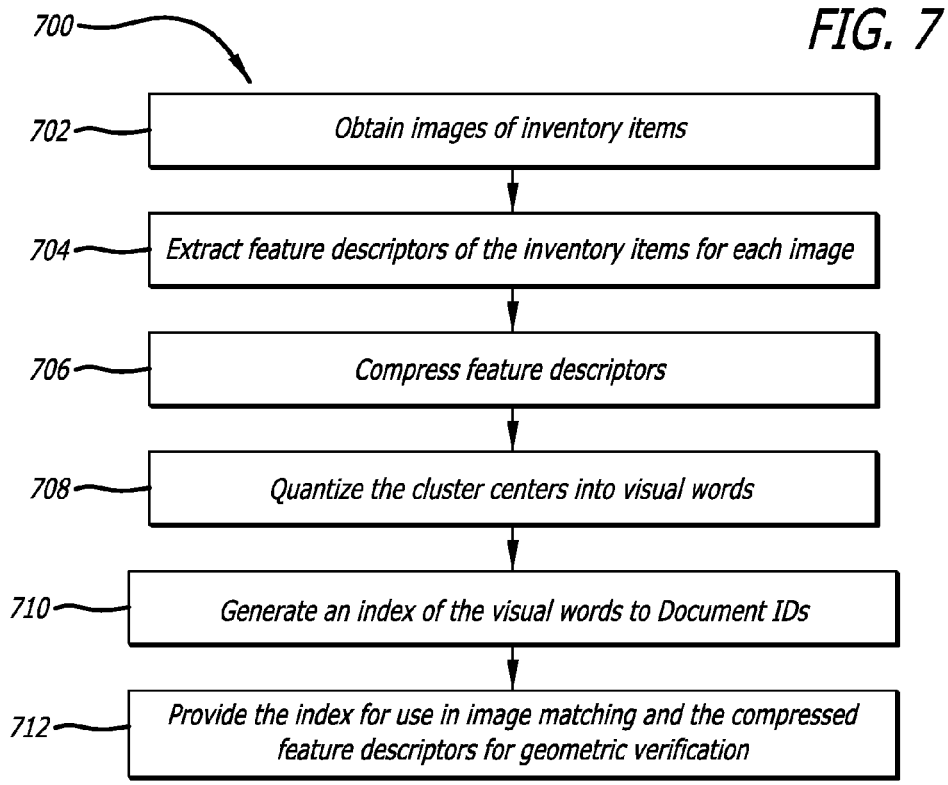
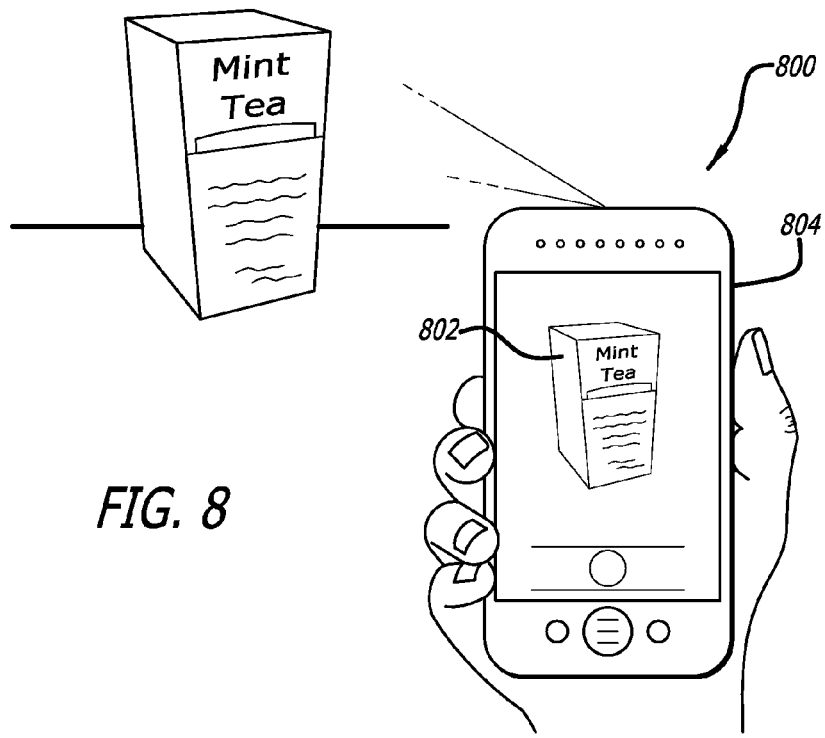

SCALABLE IMAGE MATCHING

CROSS-REFERENCES TO RELATED APPLICATIONS

This application is a continuation of U.S. application Ser. No. 14/133,252, entitled "SCALABLE IMAGE MATCHING," filed Dec. 18, 2013; which is incorporated herein by reference for all purposes.

BACKGROUND

Image matching is a technique being used in computer vision, object recognition, motion tracking, three-dimensional (3D) modeling, and the like, which can be performed to check whether two images contain the same content. For example, a user interested in determining availability of a book can capture an image of the book and submit that image to an image matching service as a query image in order to be provided with information associated with the book in return. In order to accomplish this, features of the query image can be transformed into feature descriptors and compared to feature descriptors of images of books, in this example, stored with the image matching service. Once a corresponding match is identified, information associated with the matching image (e.g., information for purchasing the book) can be provided and displayed to the user on their computing device. Accordingly, as object recognition, motion tracking, 3D modeling, and like become more widely used and as products and services provided by image matching searches increase, the amount of images being stored in various databases to enable the same are increasing. Since space for storing these images (or their respective feature descriptors) is often limited and/or expensive, it can be advantageous to adapt not only the way in which these images are stored for recall and comparison, but also the way their associated storage systems are scaled.

BRIEF DESCRIPTION OF THE DRAWINGS

Various embodiments in accordance with the present disclosure will be described with reference to the drawings, in which:

FIG. 4 illustrates example feature descriptors in accordance with at least one embodiment;

FIG. 5 illustrates example feature lookup tables that can be used in accordance with at least one embodiment;

FIG. 7 illustrates an example process for compressing features of an image that can be used in accordance with at least one embodiment;

FIG. 8 illustrates another example of a user capturing an image of an item to submit as a query image with a computing device in accordance with at least one embodiment;

DETAILED DESCRIPTION

Figure 1:
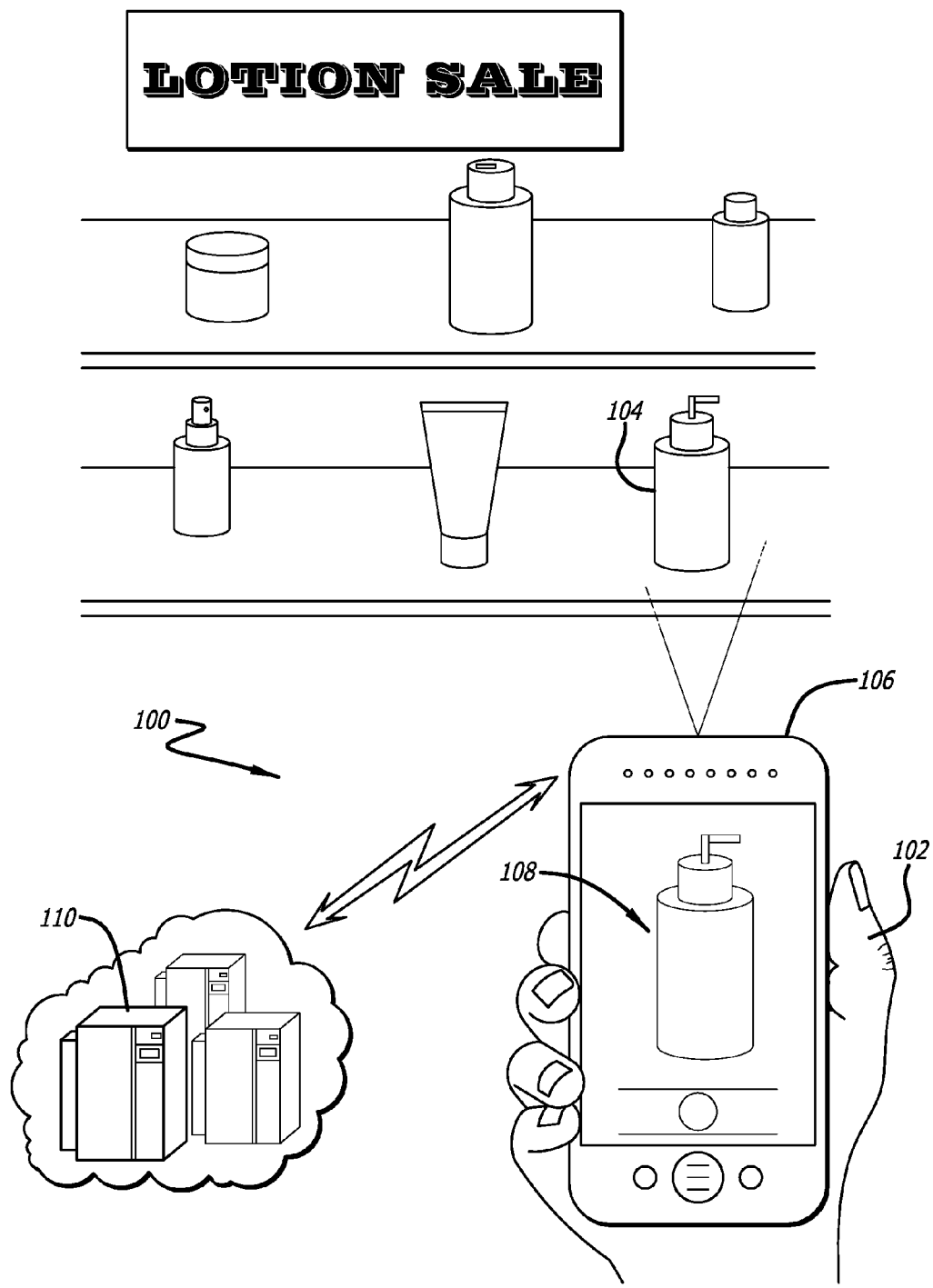
FIG. 1 illustrates an example of a user capturing an image of an item to submit as a query image with a computing device in accordance with at least one embodiment.

Systems and methods in accordance with various embodiments of the present disclosure may overcome one or more of the aforementioned and other deficiencies experienced in conventional approaches to providing information based at least in part upon a target image or other such object. In particular, various approaches may allow for the decreasing in size of image representations that are stored in a database for use in image matching and/or content retrieval. For example, a system providing an image matching service can obtain multiple images of each of a number of inventory items. In one example, the system could be associated with an electronic marketplace, the inventory items can be products available for purchase therefrom, and each of the multiple images could correspond to a different view of a respective product.

The system can extract features from each of the images using a feature extraction algorithm (e.g., Accumulated Signed Gradient) and transform the extracted features for each image into feature descriptors which can be subsequently stored and used to compare against query images submitted by users or otherwise obtained. Though the size of each feature descriptor representation may not be particularly large, the total number of these descriptors (e.g., 80 million+) can require a substantial amount of storage space. Accordingly, in at least one embodiment, one or more feature of these descriptor representations are compressed, such as by clustering the features of a given feature descriptor representation, using a center of each respective cluster as an approximation of the associated features, and encoding information for the cluster centers with fewer bits than the original cluster center representation to generate a minimized descriptor representation, which can help to minimize storage. Such a compression technique may also minimize run-time latency compared to previous techniques since the files now being retrieved and compared are relatively smaller.

In at least one embodiment, the compression can be achieved by clustering one or more feature descriptors, approximating each of a number of feature descriptors of a respective cluster as a cluster center, and encoding the cluster centers using fewer bits than the original cluster center. For example, a Hierarchical K-means (HKM) algorithm can be used to cluster the feature descriptors, and, after clustering, the cluster centers can each be assigned a visual word to textually describe each respective image (i.e., Bag-of-Words). Any type of compression (e.g., lossy compression, lossless compression, etc.) can be used to reduce the number of bits. An index of these visual words that maps each visual word to its corresponding images can be generated and made available for image matching.

Accordingly, upon receiving a query image (e.g., an image submitted by a user via a computing device), feature descriptors of features from the query image can be extracted and visual words assigned thereto. Each visual word representing the query image can then be compared against the visual words stored in the index of visual words by a search engine in a manner similar to that employed by text retrieval techniques. As a result, a set of closest matching inventory images that at least partially match the query image can be determined based at least in part upon matching visual words. Since this set of closest matching inventory images is determined by comparing visual words, these images can be geometrically verified by comparing cluster centers of each image with their respective matches using a geometric verification algorithm (e.g., RANdom SAmple Consensus algorithm).

Compressing feature descriptors can, therefore, be a means of addressing storage scalability for a system. However, this method can be susceptible to performance degradation and information loss as features are approximated by their cluster centers, as these clusters are compressed into smaller clusters, and as bits are removed. In at least one embodiment, a machine learning technique can be used to attempt to compensate for this information loss by considering such factors as consistent orientate on differences, scale differences, and the like.

Various other functions and advantages are described and suggested below as may be provided in accordance with the various embodiments.

FIG. 1 illustrates example situation 100 wherein user 102 is interacting with computing device 106. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others.

In this example, computing device 106 has at least one image capture element, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, user 102 is interested in obtaining information about item 104 which, in this example, is a bottle of lotion available for purchase in a store. The information that the user is interested in obtaining could include, for example, information related to the product's manufacture, stock availability information at another store or electronic marketplace, price information to see whether item 104 is cheaper from another retailer, or the like.

In order to obtain this information, user 102 can position computing device 106 such that at least the relevant portion of item 110 is within a field of view of at least one camera of the computing device. The resulting image 108 can then be displayed on a display screen of the computing device. Image 108 can be a still image that was captured by the camera, or can be a frame of a "live" view as captured by a video mode of the camera, etc. Using a conventional approach, user 102 can cause image 108 to be captured and uploaded to server 110 of, for example, an image matching service and, therefore, capable of running one or more image analysis or object recognition algorithms to attempt to recognize item 104 within image 108.

Figure 2:
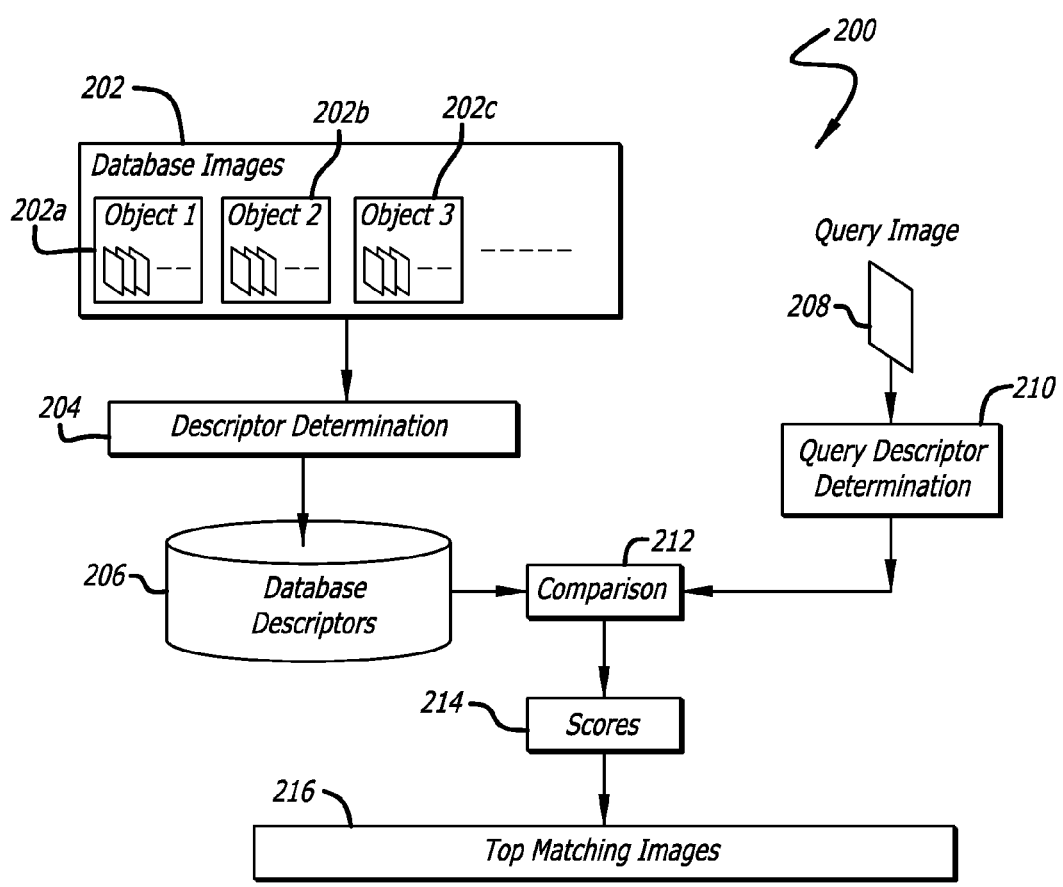
FIG. 2 illustrates an example image match system flow that can be used in accordance with at least one embodiment.

FIG. 2 illustrates an example system flow 200 of an exemplary image matching service. In order to perform object recognition, an exemplary matching service obtains inventory database images 202. The matching service will often obtain multiple images of objects (202a, 202b, 202c) from different angles in order to be able to match an image of a respective object from more than one angle or perspective. Typical image matching algorithms take advantage of the fact that an image of an object or scene contains a number of feature points (i.e., specific points in an image which are robust to changes in image rotation, scale, viewpoint or lighting conditions). Accordingly, this means that these feature points will often be present in both of two different images of an object or scene, even if the two images differ. Feature (Vector) descriptors describing each of at least a subset of features of each database image are determined 204 to create inventory feature descriptors for each database image 202. In order to determine the feature descriptors, feature points in each image are first identified. In one example, an image pyramid can be constructed to determine the feature points. The image pyramid, in this example, can be the scale-space representation of a respective image (i.e., it contains various pyramid images) each of which is a representation of the respective image at a particular scale. Such a scale-space representation enables the respective image matching system or algorithm to match images that differ in scale.

After determining the feature points of all pyramid images in the image pyramid, the orientation of each feature point can be determined. The orientation of a feature point is determined based on the local image gradient at the feature point, which is used to obtain invariance to rotation. After the feature points and their orientations are determined, a patch can be extracted around the feature point in such a way that the orientation descriptor forms one axis of the reference frame for the patch. The local image gradients on this patch are then calculated and transformed into a feature vector or feature descriptor. The feature descriptor can take into account change in local distortion and illumination (i.e., is invariant to distortion and change in lighting conditions). The feature points, their orientations and their feature descriptors over all pyramid images form a complete representation of the image. Accordingly, the feature descriptors for each of the database images 202 are stored in descriptor database 206 and used to compare against query images submitted by users.

Upon obtaining query image 208 from a user, query feature descriptors for features present in image 208 are determined 210 and these query feature descriptors are compared 212 against the database feature descriptors stored in descriptor database 206. As a result, matching scores 214 are determined and returned for each of database images 202 with respect to query image 208. In this example, each of the matching scores represents a confidence for how well a respective inventory image matches query image 208. The inventory images 216 with the highest matching score is identified as a match and information associated with the matching database image (e.g., information regarding an item in query image 208) can be provided and displayed to the user on their computing device.

As object recognition, motion tracking, 3D modeling, and other services that utilize feature descriptors store in a database, such as descriptor database 206, become more widely used and as products and services provided by image matching services increases, the amount of images and/or image feature descriptors stored in such a database to enable the same is ever expanding. This creates a storage and scalability problem, since space for storing these images and/or their respective descriptors is either limited, expensive, or both.

Figure 3:
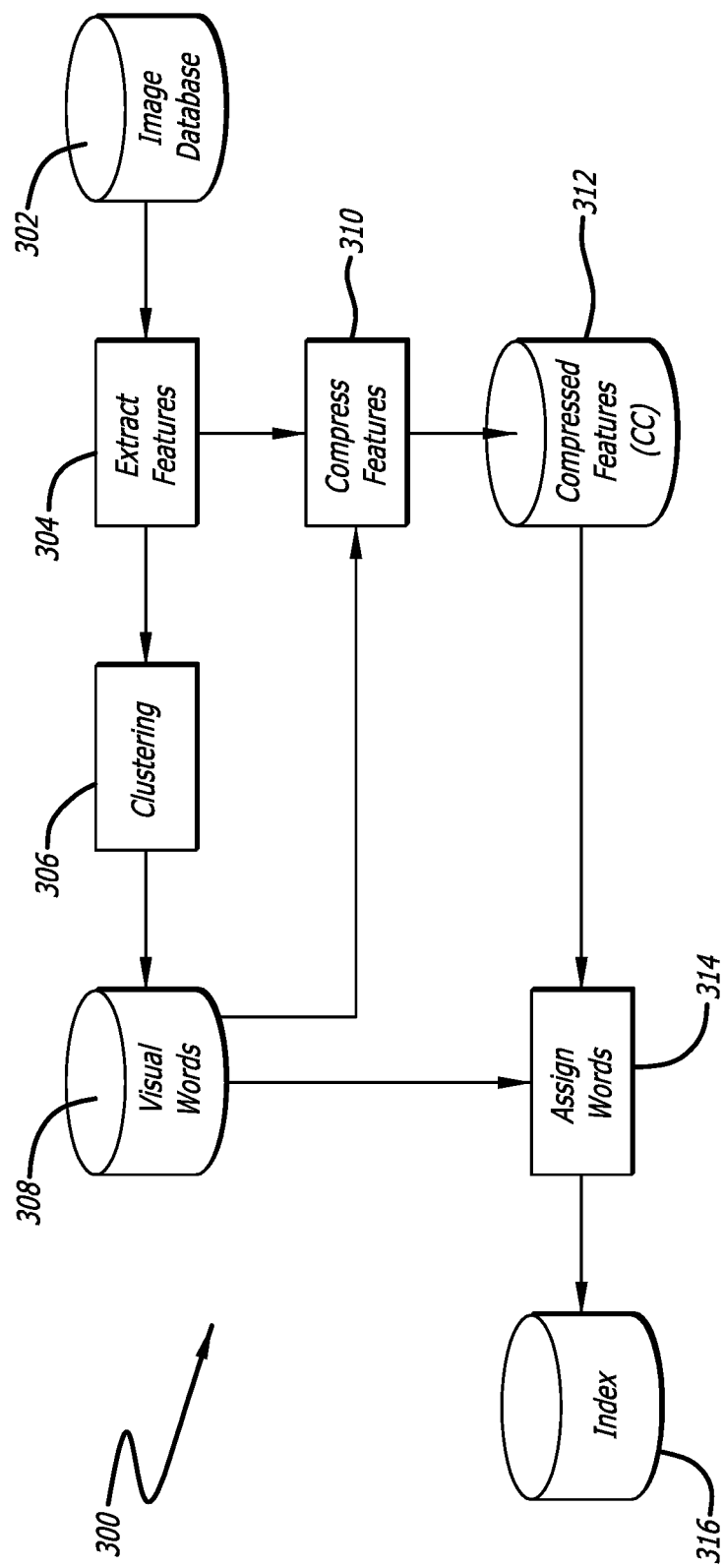
FIG. 3 illustrates an example pre-processing flow through a system in accordance with at least one embodiment.

Accordingly, approaches in accordance with various embodiments can increase scalability of image representations stored in a database for use in image matching and content retrieval. FIG. 3 illustrates an example preprocessing system flow 300 of an image matching system in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, image database 302 contains images of inventory items. First, feature descriptors are extracted 304 from each image contained in or added to image database 302, as discussed above. The feature descriptors may be extracted using a feature extraction algorithm, such as Accumulated Signed Gradient (ASG), a Scale-Invariant Feature Transform (SIFT) algorithm or the like. In one example, image database 302 does not exist and the actual images are discarded once the features have been extracted therefrom.

A clustering process 306 can then map each feature descriptor to a cluster center (i.e., feature quantization) using any suitable clustering algorithm (e.g., Hierarchical K-means, etc.). After the feature descriptors are clustered, the cluster centers can be assigned visual words or mapped to each of their own respective closest visual word. A visual word ID along with a corresponding cluster center are stored in visual word database 308 (e.g., Code Book) that can be used to look up a cluster center via a visual word or look up a visual word via a cluster center. Each visual word represents a small part of an image by carrying some kind of information related to its respective representative feature (e.g., color, shape, texture, etc.), or changes occurring in the pixels such as the filtering, low-level feature descriptors, and the like. Accordingly, a collection of visual words (i.e., a vocabulary) together provides information about a respective image and the content therein. This vocabulary or representation can enable the use of standard text search and retrieval techniques for image retrieval. This technique of treating image features as words is also known as a bag-of-words model (BoW). BoW can be considered a vector of occurrence counts of words describing an image, which can be represented in a histogram over of local image features, for example.

In this example, the feature descriptors for respective feature points of each image are compressed 310. Accordingly, the features are clustered into a value associated with their nearest corresponding cluster center. The cluster centers that geometrically describe each image are compressed and then stored in compressed features database 312. Accordingly, words from visual word database 310 are assigned to each compressed cluster center 314, as mentioned above, and the visual words along with document IDs for images that they describe are stored in index 316 (e.g., a Lucene Index). Since the cluster centers (i.e., compressed local feature descriptors) each correspond to a visual word in index 316, the numbers of times each respective visual word appears in a respective image can be determined. Each image can, therefore be described using a histogram of visual words. Accordingly, index 316 of visual words to images can be made available for image matching.

FIG. 4 illustrates a feature descriptor comparison between descriptor 402 and compressed descriptor 408 (i.e., cluster center) in accordance with at least one embodiment. In this example, descriptor 402 is approximately 64 KB. Of this 64 KB, approximately 13 KB are allocated to identifying information 404 which includes an X-axis position, a Y-axis position, scale, and orientation. The remaining 51 KB of descriptor 402 is allocated to the features. In this example, both descriptor 402 and compressed descriptor 408 are represented by 800 features. As mentioned above, though 64 KB may not be a particularly large file, a database containing 80 million+feature descriptors of this size can require a substantial amount of storage space. Accordingly, in at least one embodiment, each feature descriptor is compressed in order to decrease the storage space required to store this many feature descriptors. In this example, descriptor 408 is compressed to approximately 6.4 KB and, after compression, only 4 KB is allocated to identifying information 410 and 2.4 KB is allocated to the 800 features 412. In this example, the number of features remained constant while some of the data of those 800 features is lost during compression. In at least some embodiments, the number of features may also be decreased during compression.

FIG. 5 illustrates an example look up table for visual words database 308 from FIG. 3 that can be used in accordance with at least one embodiment. The look up table can replace runtime computation with a simpler array indexing operation which can save processing time, since retrieving a respective cluster center from memory is often faster than undergoing an expensive computation or input/output operation. In this example the look up table is formatted as an array list, where each array element corresponds to a visual word 502 and lists indices for a respective visual words corresponding compressed feature or cluster center (CC) 504. In this example, there are 6 million visual words with corresponding cluster centers. Further, the array may be populated with location information for regions of each image where a respective visual word appears. Accordingly, when performing image matching and the top matches are ready to be geometrically verified against the feature descriptors of a query image, the look up table can be accessed to quickly identify each cluster center matching a respective visual word and vice versa.

Figure 6:
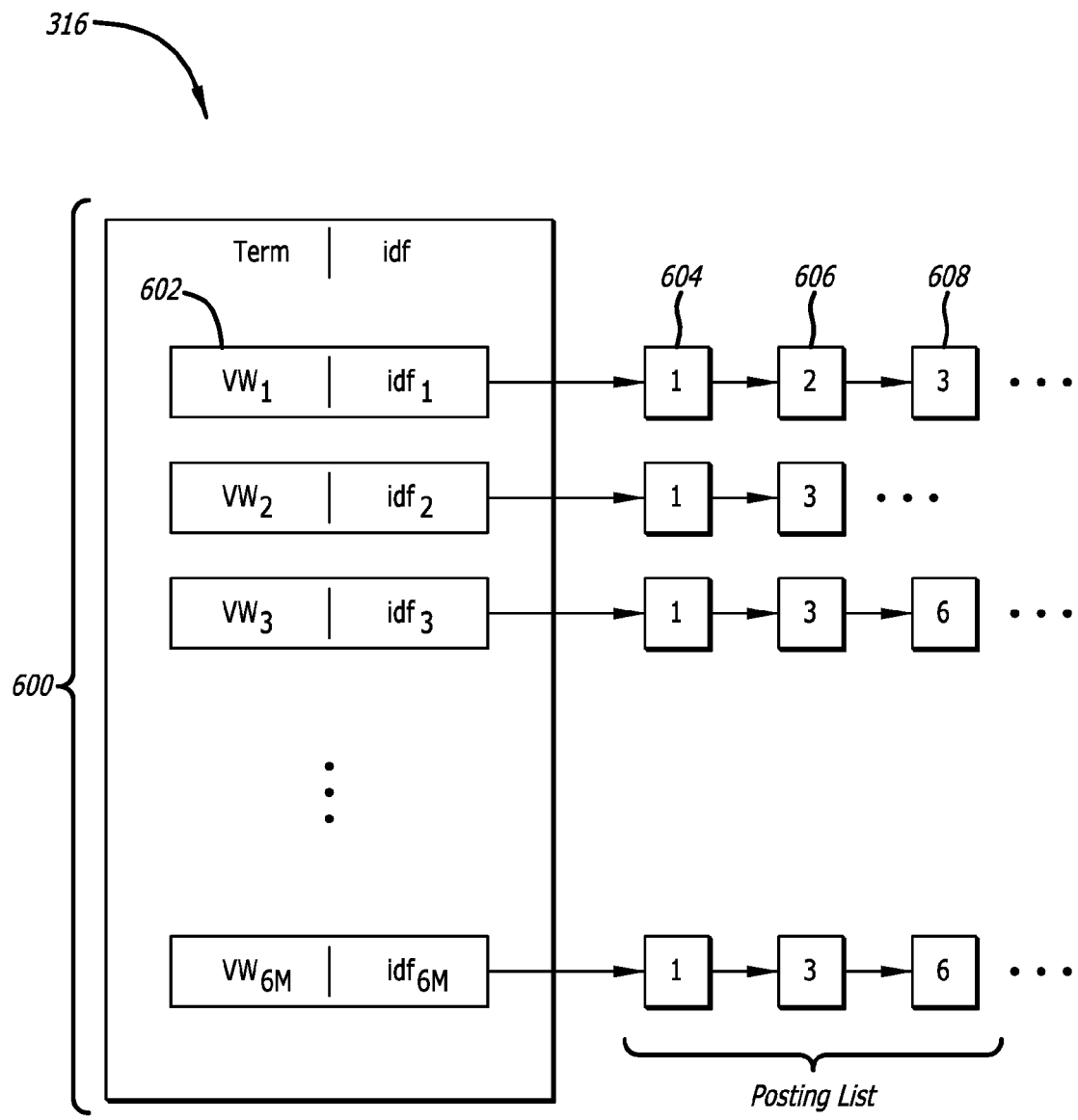
FIG. 6 illustrates an example index that can be used in accordance with at least one embodiment.

FIG. 6 illustrates an example of how index 316 (e.g., a Lucene Index) from FIG. 3 could be organized in accordance with at least one embodiment. In this example, index 316 is an inverted index that references multiple documents (604, 606, 608) or images that are each represented in part by a respective visual word (i.e., the respective visual word represents a feature in each referenced document). It is called an inverted list because this is typically the inverse of the natural relationship in text searching, in which documents list terms, in typical search indexes. In this example, index 316 is composed of index hit list 600 of individual visual words 602 followed by a posting list of document identification numbers (IDs) for documents (604, 606, 608) that correspond to images. In this example, index hit list 600, as in the previous example, includes 6 million visual words. Generally, each feature for a respective visual word 602 describes where the respective visual word appears in a respective image. Further, index 316 can also store statistics about visual words in order to make word based search more efficient. Accordingly, when matching an image, as mentioned above, index 316 can be accessed to quickly identify each image associated with a respective visual word.

FIG. 7 illustrates an example process 700 for compressing features of an image as part of a preprocessing method that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a system providing an image matching service can obtain multiple images of a number of inventory items 702. The system may be associated with an electronic marketplace and the inventory items could be products available for purchase therefrom, where each of the images could correspond to a different view of each respective product.

In this example, the system can extract features from each of the images using a feature extraction algorithm (e.g., Accumulated Signed Gradient) and transform the same into their feature descriptor representations which can be subsequently stored and used to compare against query images submitted by users 704. Though the file size of each feature descriptor representation is not particularly large (e.g., ~64 KB), the total number of these descriptors (e.g., 80 million+) can require a substantial amount of storage space. Accordingly, in at least one embodiment, one or more feature descriptor representations are compressed. The compression can be achieved by clustering these descriptor representations, approximating the cluster center, and compressing the file size of the cluster center (e.g., to ~6.5 KB) to decrease storage 706. Accordingly, one or more feature descriptors are compressed from a first file size to a compressed cluster center having a second smaller file size.

Compressing these descriptors can, therefore, be achieved by bundling each of these feature descriptors or a set of these feature descriptors into a single cluster center (i.e., clustering). For example, a Hierarchical K-means (HKM) algorithm can be used to group the feature descriptors and the center of each of these groups (i.e., cluster centers) can be assigned or taken as a visual word as a technique for building a vocabulary of a respective image (i.e., feature quantization) 708. An index of that maps each visual word to one or more images can then be generated 710 and the index can be made available for use in image matching 712.

Figure 9:
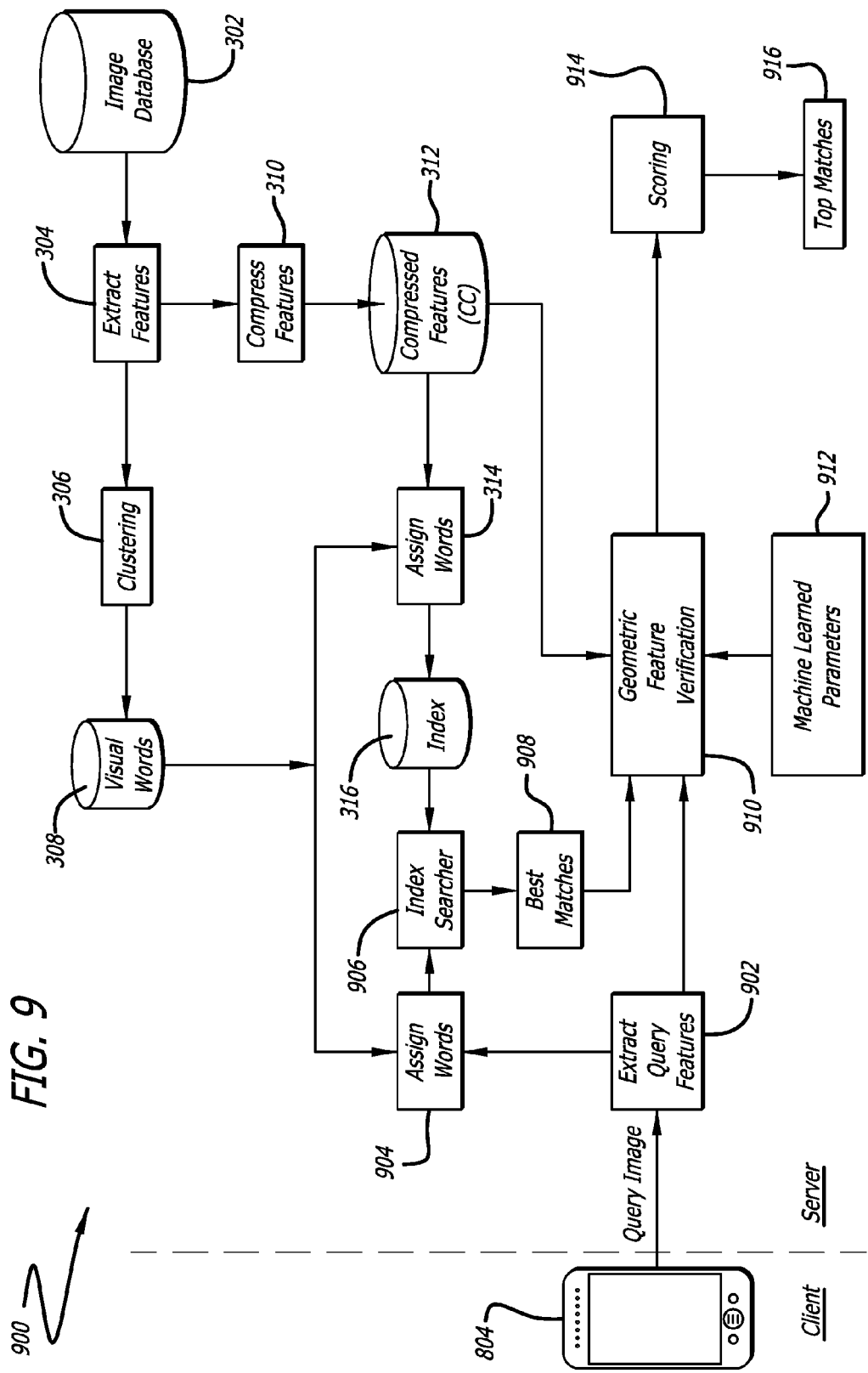
FIG. 9 illustrates an example run-time flow through a system in accordance with at least one embodiment.

FIG. 8 illustrates example situation 800 wherein a user is capturing an image of a box of mint tea 802 with computing device 804 to submit the same as a query image. Upon capturing an image of the box of mint tea 802, the user can send the query image, or one or more query images can be automatically sent by computing device 804, to an image matching system, as shown in FIG. 9. Accordingly, FIG. 9 illustrates an example run-time process system flow 900 of the image matching system discussed above with respect to FIG. 3.

In this example, computing device 804 sends the query image to the image matching system where, upon receiving the query image, the system extracts query features 902 and calculates query features descriptors from the same using ASG or any other suitable feature extraction algorithm, as similarly discussed above. After the features are extracted, visual words are assigned 904 using the visual words from visual word database 308. These assigned words are then compared against index 316 by index searcher 906 to identify or extract the best tf-idf image matches 908. Tf-idf (term frequency-inverse document frequency) is a statistic reflecting how important an assigned word is to a respective image in index 316 and is used as a weighting factor. When retrieving matching images, each query visual word essentially votes on its matched images and the tf-idf value increases proportionally to the number matching visual words. Accordingly, the matched images can be ranked by the sum of their respective weighted votes.

In at least one embodiment, once the best matches are determined, geometric feature verification of these closest matching inventory images can be performed 910 by comparing the query feature descriptors to the cluster centers of each closest matching inventory image. At this stage, a look up table, such as that discussed with respect to FIG. 5, can be used to look up cluster centers of corresponding assigned words that match the query assigned words. Accordingly, the corresponding cluster centers are retrieved from compressed feature database 312 and compared to the extracted query features descriptors 902 using a geometric verification algorithm, such as RANSAC. As mentioned above, compressing these feature descriptors can be a means of addressing storage scalability, however, this method can be susceptible to performance degradation and information loss since the features are approximated by their cluster centers, these clusters may also be compressed into smaller clusters, and the files of these cluster centers are also compressed. In at least one embodiment, a machine learning process provides parameters 912 that can compensate for this information loss, as will be described in greater detail below. Accordingly, the closest matching inventory images are scored 914 based on their respective matching features and the identification numbers for the top matches are returned 916.

As discussed above, compressing the feature descriptors into cluster centers can be a way of improving scalability for an image matching system. As a result of compressing these files, however, there can be a drop in recall due to a "loss of information." which can have adverse effects in difficult to retain feature categories (e.g., foreshortening, etc.). This loss of information may lead to a reduction in the number of quality matches in a set of putative correspondences (i.e., corresponding features from both the query image and database image) that are eventually passed to RANSAC for geometric verification. Machine learning and other representation learning algorithms attempt to preserve information in their inputs in order to transform the same in a way that makes it useful, often in a pre-processing step before performing subsequent classification or predictions, thereby allowing for the reconstruction of respective inputs coming from an unknown potentially incomplete, degraded, or evolving data source. In this instance, the compressed cluster centers can essentially be considered degraded feature descriptors since they carry less information in their compressed form. Accordingly, a machine learned model applied at runtime can at least partially compensate for the information loss from the resulting compression and recover appropriate matches using, for example, a relatively small bit budget to recover one or more lightweight binary features. This process will be described in further detail with respect to FIGS. 10-11.

Figure 10:
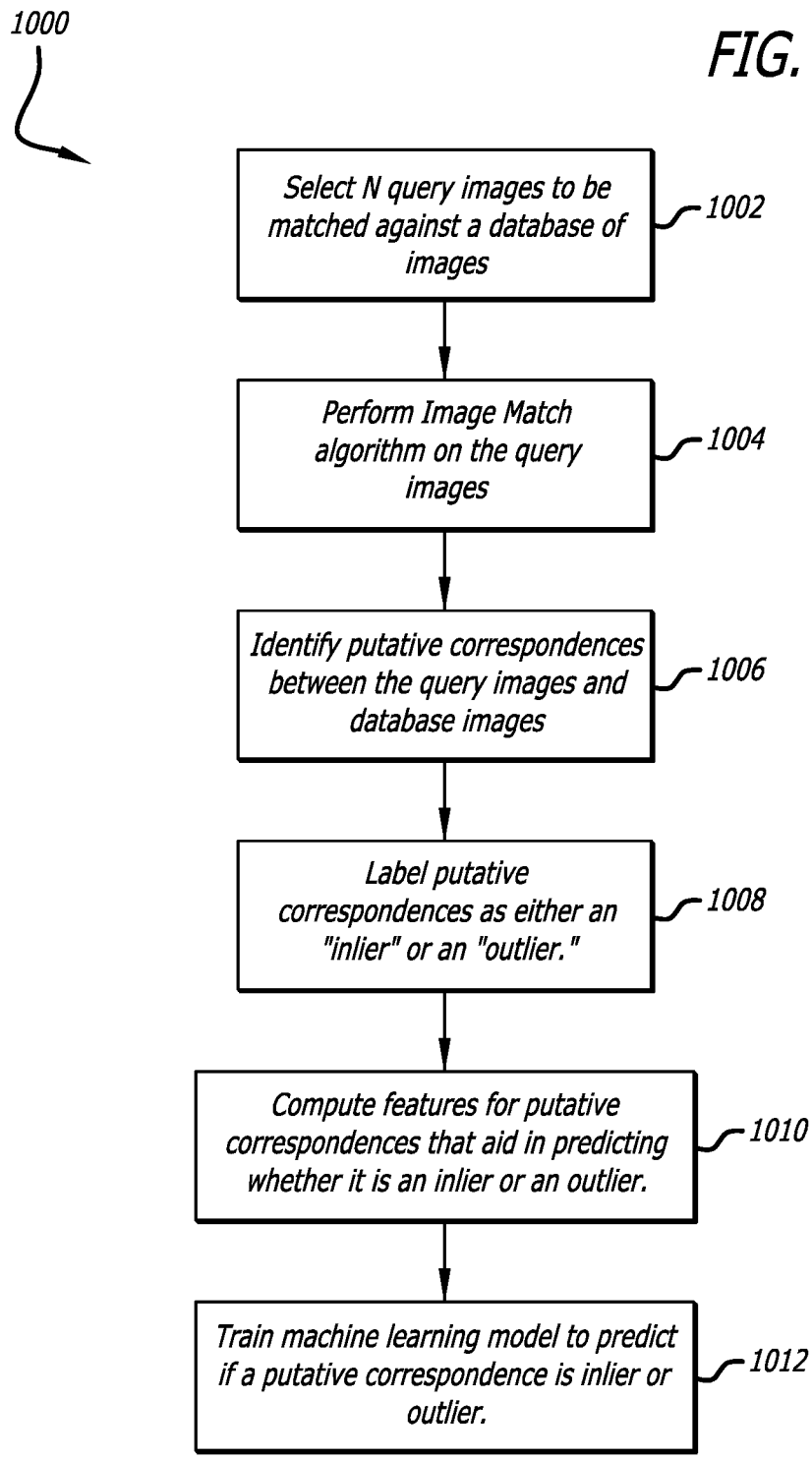
FIG. 10 illustrates an example machine learning flow in accordance with at least one embodiment.

FIG. 10 illustrates an example machine learning process 1000 that can be used in accordance with various embodiments. Process 1000 can within the scoped of various embodiments be used for training a rule or model that can determine more optimal selection of putative correspondences for use in geometric verification. Accordingly, in an off-line process, N query images are selected to be matched against a database of images 1002. These N images are selected so that they represent a variety of different conditions (e.g., specularity, occlusion, clutter, foreshortened, low coverage, standard, etc.). Image matching is performed by running an image match algorithm on these N query images 1004.

The results of the performed image matching returns a number of putative correspondences (i.e., a feature from the query image and corresponding database image feature) which are potentially matching ASG features determined by comparing respective visual words and are considered putative because they have yet to be determined as actual final matches. In this example, the putative correspondences for each correctly matching query image are identified 1006. These putative correspondences are identified and label either as an "inlier" (i.e., a correct correspondence) or an "outlier" (i.e., an incorrect correspondence) 1008. Accordingly, characteristics (e.g., matching score of ASG features, consistency of angle difference with dominant angle difference, consistency of scale difference with dominant scale difference, etc.) of each putative correspondence which aids in predicting whether a respective correspondence is an inlier or an outlier is computed 1010. A machine learning model or rule, linear or non-linear, which uses these features to predict whether a putative correspondence is inlier or outlier is trained using these characteristics 1012. Accordingly, lat run-time, this learned model or rule can then be applied to predict whether a putative correspondence is an inlier and the top scoring putative correspondences are then chosen and used in geometric verification.

Figure 11:
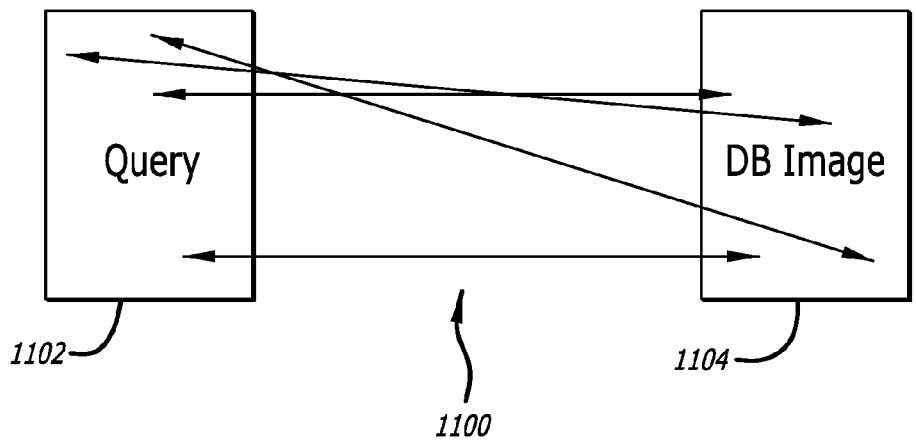
FIG. 11 illustrates an example correspondence diagram between matching features in accordance with at least one embodiment.

FIG. 11 illustrates example correspondence diagram 1100 showing matching features or putative correspondences 1102 between query image 1104 and database image 1106 in accordance with at least one embodiment. Within this set of putative correspondences 1102, there can be correct matching pairs or inliers and incorrect matching pairs or outliers. Accordingly, when the feature descriptors are compressed, the set of putative correspondences 1102 degrades, therefore, resulting in more outliers than inliers. More outliers than inliers is a problem for RANSAC. This can be particularly problematic when considering, for example, approximately 500 features, as are often used in conventional image matching approaches, which may contain more inliers as compared to outliers.

In at least one embodiment, an approach using cluster centers may start with a larger set of putative correspondences 1102 (e.g., ~1500), since many of the inliers may have slipped down in the ranking as a result of compression. Using machine learning, lower ranking inliers from a larger set of putative correspondences 1102 can be re-ranked into higher consideration (e.g., back into the top 500). Then RANSAC can be run once again on this re-ranked set. In order to re-rank these features back into higher consideration, a training data set (where the data is labeled as a match or not a match) can be used along with a linear classifier rule to predict whether a respective putative correspondence is likely to an inlier or an outlier. In machine learning, one goal of statistical classification involves using an object's characteristics to identify which class, category, or group it belongs to. A linear classifier can achieve this by making a classification decision based on the value of a linear combination of the characteristics. An object's characteristics are also known as feature values and are typically presented as a feature vector. For example, a linear combination of the characteristics for a respective correspondence could be considered a match if:

$$W_{ASG} * S_{ASG} + W_{TBD} * S_{TBD} > \text{Threshold},$$

where $W_{ASG}$ is the weight a respective ASG feature, $S_{ASG}$ is the ASG feature, $W_{TBD}$ is the weight of a corresponding database feature, and $S_{TBD}$ is the corresponding database feature. If this value is greater than a respective Threshold, then the respective ASG feature is considered an inlier, otherwise it is considered an outlier. Other classifiers such as a Naive Bayes classifier and the like can also be used within the scope of various embodiments. Accordingly, the inliers are then passed to RANSAC for geometric verification. Therefore, the training ASG feature data set is, in this example, used as an input signal along with matching scores from other lightweight features (e.g., scale differences, consistent orientation, etc.) to determine $W_{ASG}$ and $W_{TBD}$.

In one example, support vector machines (SVM), which are supervised learning models with associated learning algorithms, can be used to analyze data from the training set and recognize patterns, which can then be used for classification and regression analysis. Accordingly, SVM can take the training data and predict whether a respective correspondence is an outlier or an inlier and build a model that assigns a new or subsequent unknown feature into a respective category. An SVM model, therefore, is a representation of the features as points in space, mapped so that the features of separate categories can be divided from each other. New features can then be mapped into the same space and predicted to belong to a respective category based on their spatial relationship with the divided categories.

Figure 12:
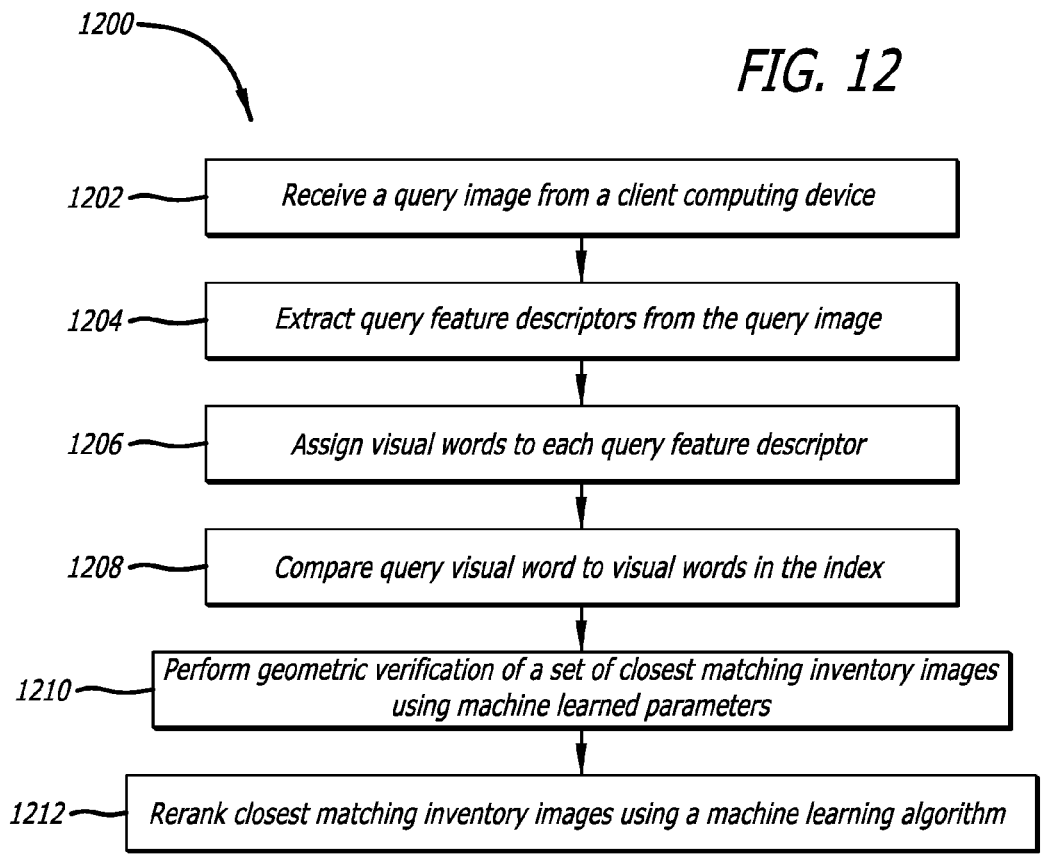
FIG. 12 illustrates an example run-time process for comparing compressing features of an image to a query image that can be used in accordance with at least one embodiment.

FIG. 12 illustrates an example runtime process 1200 for comparing compressing features of an image to a query image that can be used in accordance with at least one embodiment. After each training image has been encoded as a histogram of visual words represented by a cluster center, as similarly described above in FIG. 7, a query image (e.g., an image submitted by a user via a computing device) can be received from a client computing device 1202 for image matching. The first stage of the image matching is to find feature points in the query image. In one example, an image pyramid can be constructed to determine the feature points. After determining the feature points of all pyramid images in the image pyramid, the orientation of each feature point can be determined. The orientation of a feature point is determined based on the local image gradient at the feature point. Orientation is used to obtain invariance to rotation. The local image gradients on a patch around each feature point can then be calculated and a feature vector or feature descriptor can be calculated for each feature point 1204.

In this example, visual words are assigned to each query feature descriptor 1206. Since text retrieval systems depend on terms, the query image can be converted into a set of visual words. The visual word representing the query image can then be compared against the visual words stored in the index by a search engine in a manner similar to text retrieval techniques. In this example, query visual words are compared to visual words in the index 1208. This produces a list indicating which database images match most closely with the query image. Accordingly, this list is ranked according a comparison between histograms of the query image and each respective database or inventory image. In this example, geometric verification of a set of closest matching inventory images is performed 1210. Accordingly, since this set of closest matching images is determined by comparing visual words, these images are then be geometric verified by comparing cluster centers of each database image with their respective query feature descriptor matches using a geometric verification algorithm (e.g., RANdom SAmple Consensus algorithm). In this example, closest matching inventory images are re-ranked by expanding the number of and re-ranking cluster centers of respective matches using a machine learning algorithm 1212.

Figures 13A, 13B:
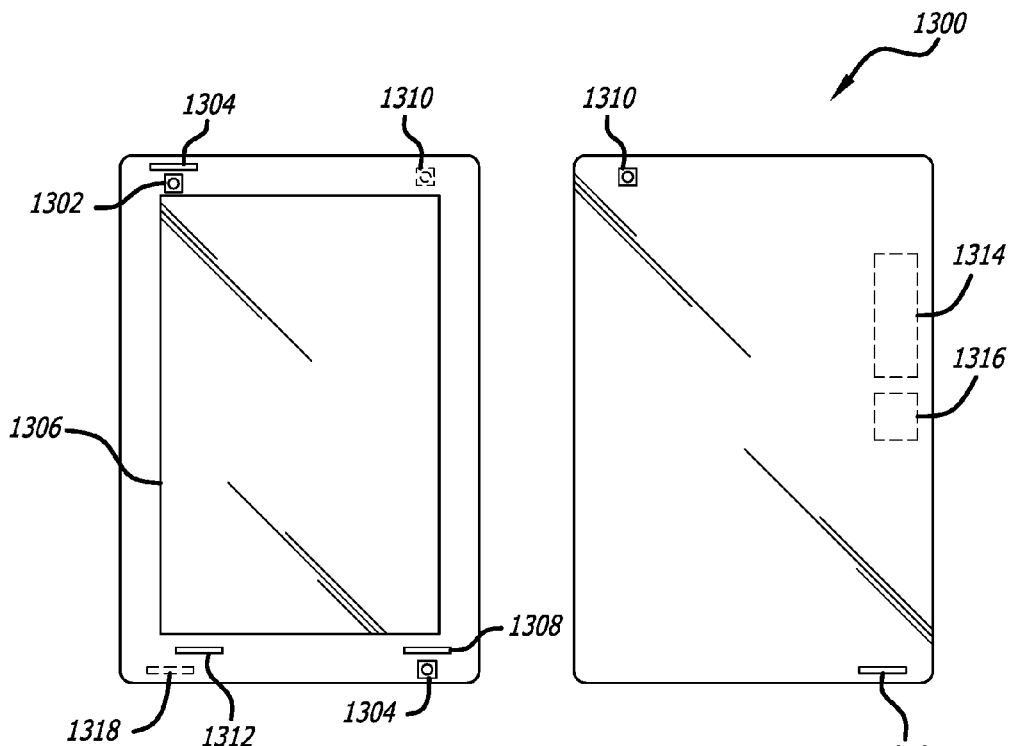
FIGS. 13A and 13B illustrate an example computing device that can be used to implement aspects of various embodiments.

FIGS. 13A and 13B illustrate front and back views, respectively, of an example electronic computing device 1300 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1300 has a display screen 1302 (e.g., an LCD element) operable to display information or image content to one or more users or viewers of the device. The display screen of some embodiments displays information to the viewer's facing the display screen (e.g., on the same side of the computing device as the display screen). The computing device in this example can include one or more imaging elements, in this example including two image capture elements 1304 on the front of the device and at least one image capture element 1310 on the back of the device. It should be understood, however, that image capture elements could also, or alternatively, be placed on the sides or corners of the device, and that there can be any appropriate number of capture elements of similar or different types. Each image capture element 1304 and 1310 may be, for example, a camera, a charge-coupled element (CCD), a motion detection sensor or an infrared sensor, or other image capturing technology.

As discussed, the device can use the images (e.g., still or video) captured from the imaging elements 1304 and 1310 to generate a three-dimensional simulation of the surrounding environment (e.g., a virtual reality of the surrounding environment for display on the display element of the device). Further, the device can utilize outputs from at least one of the image capture elements 1304 and 1310 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1308 on the front side, one microphone 1312 on the back, and one microphone 1306 on or near a top or side of the device. In some devices there may be only one microphone, while in other devices there might be at least one microphone on each side and/or corner of the device, or in other appropriate locations.

The device 1300 in this example also includes one or more orientation- or position-determining elements 1318 operable to provide information such as a position, direction, motion, or orientation of the device. These elements can include, for example, accelerometers, inertial sensors, electronic gyroscopes, and electronic compasses.

The example device also includes at least one communication mechanism 1314, such as may include at least one wired or wireless component operable to communicate with one or more electronic or computing devices. The device also includes a power system 1316, such as may include a battery operable to be recharged through conventional plug-in approaches, or through other approaches such as capacitive charging through proximity with a power mat or other such element. Various other elements and/or combinations are possible as well within the scope of various embodiments.

Figure 14:
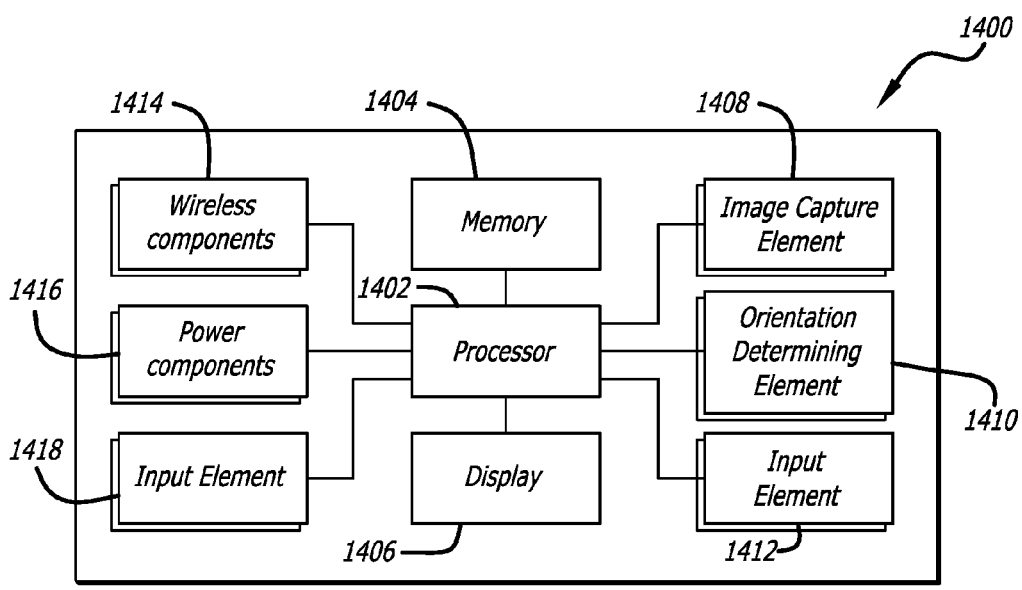
FIG. 14 illustrates example components that can be used with a device such as that illustrated in FIGS. 13A and 13B.

FIG. 14 illustrates a set of basic components of an electronic computing device 1400 such as the device 1300 described with respect to FIG. 13. In this example, the device includes at least one processing unit 1402 for executing instructions that can be stored in a memory element or element 1404. As would be apparent to one of ordinary skill in the art, the device can include many types of memory, data storage, or computer-readable media, such as a first data storage for program instructions for execution by the processing unit(s) 1402, the same or separate storage can be used for images or data, a removable memory can be available for sharing information with other devices, and any number of communication approaches can be available for sharing with other devices.

The device typically will include some type of display element 1406, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1408, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1400 also includes at least one orientation determining element 1410 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1400. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1412 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1414 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1416, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 1418 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 15:
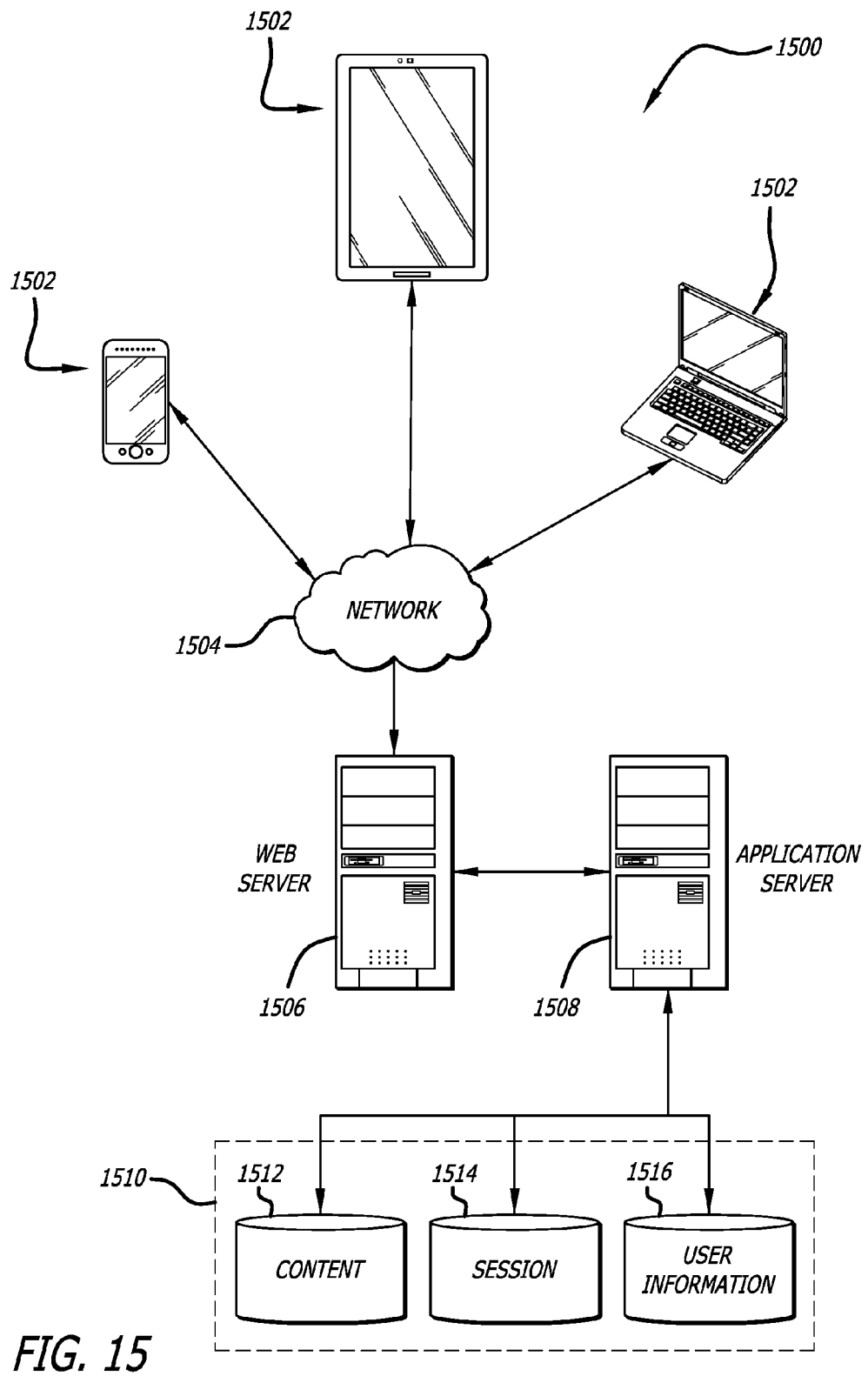
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof.

In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
matching a plurality of training images against a database of images using one or more training features associated with the plurality of training images;
receiving one or more matching images from the database of images, wherein each matching image includes a plurality of correspondences with the one or more training features from the plurality of training images;
labeling a first subset of the plurality of correspondences as inlier correspondences and a second subset of the plurality of correspondences as outlier correspondences;
determining a first set of characteristics of the first subset of the plurality of correspondences;
determining a second set of characteristics of the second subset of the plurality of correspondences;
training one or more classifiers using the first set of characteristics and the second set of characteristics to generate a prediction model, wherein the prediction model is used at runtime to determine matching scores for the database of images in response to a query image;
ranking the database of images by comparing features from the query image to a set of compressed cluster centers corresponding to a set of closest matching database images; and
adjusting the ranking of the set of closest matching database images using the prediction model, wherein adjusting the ranking of the set of closest matching database images includes determining whether a respective compressed cluster center is an inlier or an outlier using the one or more classifiers.

2. The computer-implemented method of claim 1, wherein the prediction model includes a support vector machine model which represents the one or more training features as points in space, and wherein features extracted from the query image are mapped into the space to predict whether a subset of images from the database of images match the query image.

3. The computer-implemented method of claim 1, wherein the one or more training features are extracted using an Accumulated Signed Gradient (ASG) algorithm.

4. The computer-implemented method of claim 3, wherein training the one or more classifiers includes computing one or more parameters based on the first set of characteristics and the second set of characteristics, the one or more parameters including weight values applied to the one or more training features extracted using the ASG algorithm.

5. The computer-implemented method of claim 4, wherein a linear combination of the weight values and feature values corresponding to the one or more training features is determined and compared to a threshold value.

6. The computer-implemented method of claim 1, wherein the one or more classifiers use at least one of a scale difference or consistent orientation as an additional input for reranking the set of closest matching inventory images.

7. A computing system, comprising:
a processor; and
memory including instructions that, when executed by the processor, cause the computing system to:
match a plurality of training images against a database of images using one or more training features associated with the plurality of training images;
receive one or more matching images from the database of images, wherein each matching image includes a plurality of correspondences with the one or more training features from the plurality of training images;
label a first subset of the plurality of correspondences as inlier correspondences and a second subset of the plurality of correspondences as outlier correspondences;
determine a first set of characteristics of the first subset of the plurality of correspondences;
determine a second set of characteristics of the second subset of the plurality of correspondences; and
train one or more classifiers using the first set of characteristics and the second set of characteristics to generate a prediction model, wherein the prediction model is used at runtime to determine matching scores for the database of images in response to a query image;
rank the database of images by comparing features from the query image to a set of compressed cluster centers corresponding to a set of closest matching database images; and
adjust the ranking of the set of closest matching database images using the prediction model, wherein adjusting the ranking of the set of closest matching database images includes determining whether a respective compressed cluster center is an inlier or an outlier using the one or more classifiers.

8. The computing system of claim 7, wherein the prediction model includes a support vector machine model which represents the one or more training features as points in space, and wherein features extracted from the query image are mapped into the space to predict whether a subset of images from the database of images match the query image.

9. The computing system of claim 7, wherein the one or more training features are extracted using an Accumulated Signed Gradient (ASG) algorithm.

10. The computing system of claim 9, wherein training the one or more classifiers includes computing one or more parameters based on the first set of characteristics and the second set of characteristics, the one or more parameters including weight values applied to the one or more training features extracted using the ASG algorithm.

11. The computing system of claim 10, wherein a linear combination of the weight values and feature values corresponding to the one or more training features is determined and compared to a threshold value.

12. The computing system of claim 7, wherein the one or more classifiers use at least one of a scale difference or consistent orientation as an additional input for reranking the set of closest matching inventory images.

13. A non-transitory computer readable storage medium including instructions stored thereon which, when executed by a processor, cause the processor to:
match a plurality of training images against a database of images using one or more training features associated with the plurality of training images;
receive one or more matching images from the database of images, wherein each matching image includes a plurality of correspondences with the one or more training features from the plurality of training images;
label a first subset of the plurality of correspondences as inlier correspondences and a second subset of the plurality of correspondences as outlier correspondences;
determine a first set of characteristics of the first subset of the plurality of correspondences;

determine a second set of characteristics of the second subset of the plurality of correspondences; and train one or more classifiers using the first set of characteristics and the second set of characteristics to generate a prediction model, wherein the prediction model is used at runtime to determine matching scores for the database of images in response to a query image;

rank the database of images by comparing features from the query image to a set of compressed cluster centers corresponding to a set of closest matching database images; and adjust the ranking of the set of closest matching database images using the prediction model, wherein adjusting the ranking of the set of closest matching database images includes determining whether a respective compressed cluster center is an inlier or an outlier using the one or more classifiers.

14. The non-transitory computer readable storage medium of claim 13, wherein the prediction model includes a support vector machine model which represents the one or more training features as points in space, and wherein features extracted from the query image are mapped into the space to predict whether a subset of images from the database of images match the query image.

15. The non-transitory computer readable storage medium of claim 13, wherein the one or more training features are extracted using an Accumulated Signed Gradient (ASG) algorithm.

16. The non-transitory computer readable storage medium of claim 15, wherein training the one or more classifiers includes computing one or more parameters based on the first set of characteristics and the second set of characteristics, the one or more parameters including weight values applied to the one or more training features extracted using the ASG algorithm.

17. The non-transitory computer readable storage medium of claim 13, wherein the one or more classifiers use at least one of a scale difference or consistent orientation as an additional input for reranking the set of closest matching inventory images.

* * * * *